United States Patent [19]

Steiner

[11] 4,205,388
[45] May 27, 1980

[54] TAXIMETER

[75] Inventor: Jack Steiner, Laval, Canada

[73] Assignee: Centrodyne Corporation, Montreal, Canada

[21] Appl. No.: 816,296

[22] Filed: Jul. 18, 1977

[51] Int. Cl.² ............................................. G07B 13/10
[52] U.S. Cl. .................................. 364/900; 364/467; 235/30 R
[58] Field of Search ............... 364/900 MS File, 467, 364/464, 200 MS File; 235/30 R, 45, 92 TC; 346/15, 16

[56] References Cited

U.S. PATENT DOCUMENTS

| 3,860,806 | 1/1975 | Fichter et al. ........................ 364/467 |
| 3,860,807 | 1/1975 | Fichter et al. ........................ 364/467 |
| 3,931,508 | 1/1976 | Kelch .................................. 235/30 R |
| 3,937,933 | 2/1976 | Warkentin ............................ 364/467 |
| 3,953,720 | 4/1976 | Kelch .................................. 364/464 |
| 4,024,384 | 5/1977 | Tateishi et al. ...................... 364/467 |

FOREIGN PATENT DOCUMENTS 2656848  12/1976  Fed. Rep. of Germany ........... 364/467

OTHER PUBLICATIONS

*Electrical Design News,* vol. 22, No. 6, Mar. 1977.

*Primary Examiner*—Raulfe B. Zache

[57] ABSTRACT

The invention relates to a dedicated microprocessor for an electronic taximeter, and a taximeter including the microprocessor. The microprocessor includes, (a) a main memory for storing data at a plurality of storage locations therein; (b) a data memory for receiving input data at a plurality of storage locations therein; (c) a combiner for combining the data storage locations of the main memory with the input data of respective storage locations of the data memory for updating the main memory; (d) a program memory for controlling the operation of the data memory, and comprising a plurality of storage locations therein; (e) a counter for sequentially selecting the storage locations of the main memory and the program memory; and (f) clock means for driving the counter means through its cycle. The main memory means is preferably a random access memory (RAM), and the data memory means and the program memory means can comprise, respectively, first and second read only memory (ROM) means. Each of the storage locations of the RAM and the first ROM comprise four bits of information whereby a single binary coded digit (BCD) can be stored at each of the aforesaid storage locations, and the combiner is preferably a BCD adder.

3 Claims, 3 Drawing Figures

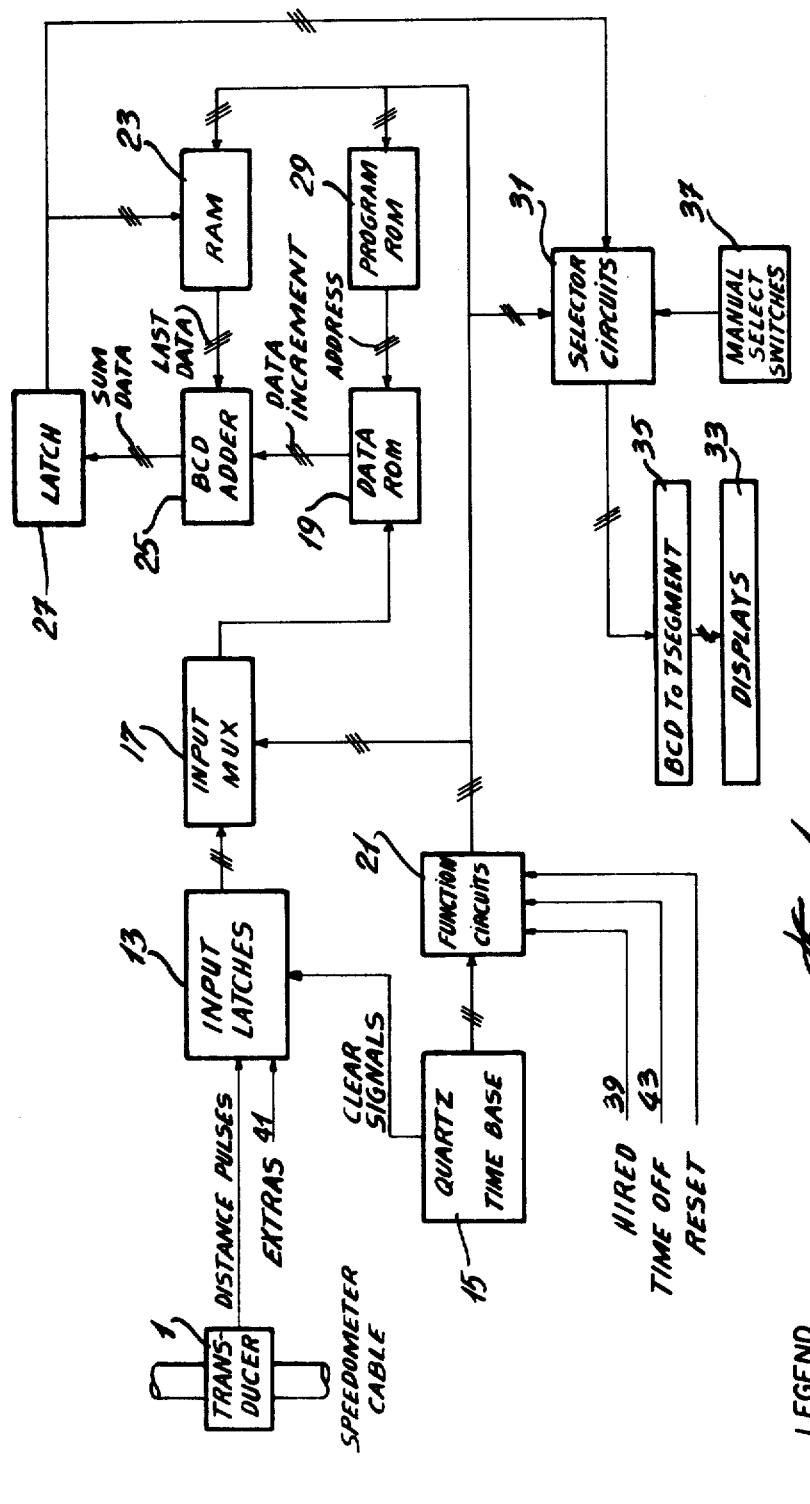

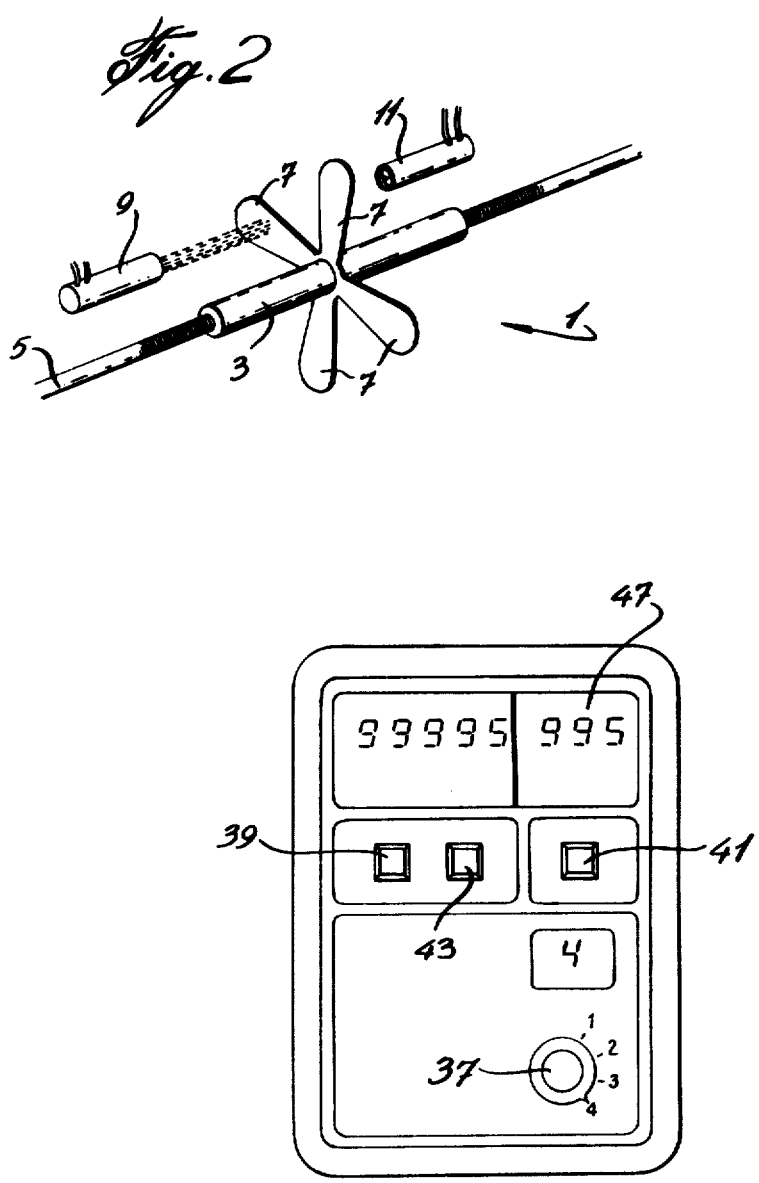

TAXIMETER

BACKGROUND OF THE INVENTION

1. Field of the Invention

This invention relates to an electronic taximeter. More specifically, this invention relates to such a taximeter which utilizes discrete microcircuits for the purpose of forming a dedicated microprocessor adapted to carry out the functions required by a taximeter.

2. Description of the Prior Art

To a large extent, taximeters available in taxies today are of the mechanical type. These are heavy and bulky and difficult to calibrate accurately on a time basis. In addition, the process for calibrating mechanical taximeters to new fare rates is awkward and expensive as it usually requires changes in computing gears. The mechanical versions also suffer from poor accuracy and a lack of adequate resolution as well as limitations on the number of optional rates. In addition, they have limited feature capability and fail to take advantage of available technology.

Electronic taximeters have also been designed, but these have failed to match the mechanical taximeters in cost and general performance. General purpose microprocessor based electronic taximeters have so far proved uncompetitive due to poor temperature performance, high cost, susceptibility to electrical interference from the cars electrical system, and generally poor design. The use of a general purpose microprocessor is expensive because of the provision, in the microprocessor, of capabilities, which must be paid for, but which are not employed in the operation of the taximeter.

SUMMARY OF THE INVENTION

It is therefore an object of the invention to provide an electronic taximeter which overcomes the above difficulties.

It is a more specific object of the invention to provide an electronic taximeter which incorporates more features, and is competitive in cost and superior in performance to mechanical taximeters.

It is a still more specific object of the invention to provide such an electronic taximeter which eliminates the high cost and other difficulties of general purpose microprocessors.

These, and other objects, are realised, in accordance with the invention, by providing an electronic taximeter which utilizes a dedicated microprocessor formed of discrete, off the shelf and readily available microcircuits.

In accordance with a specific embodiment, a dedicated microprocessor for a taximeter comprises: (a) main memory for storing data at a plurality of storage locations therein; (b) data memory means for receiving input data at a plurality of storage locations therein; (c) combining means for combining the data of storage locations of the main memory means with the input data of respective storage locations of the data memory means for updating the main memory; (d) program memory means for controlling the operation of the data memory means, and comprising a plurality of storage locations therein; (e) counter means for sequentially selecting the storage locations of said main memory means and said program memory means; and (f) clock means for driving the counter means through its cycle.

The main memory means may comprise a random access memory (RAM), and the data memory means and the program memory means may comprise, respectively, first and second read only memory (ROM) means.

In a preferred embodiment, each of said storage locations of the RAM and the first ROM comprise four bits of information whereby a single binary coded digit (BCD) can be stored at each of said aforesaid storage locations, and said combining means comprises a BCD adder.

The microprocessor may further include latch means having an input connected at the output of said BCD adder, and an output connected to an input of said RAM whereby updated data from said BCD adder is provided to said RAM.

The microprocessor may still further comprise an input multiplexer having an output connected to an input of said first ROM, said counter means being connected to said multiplexer; and input latches having an output connected to an input of said multiplexer and having inputs connected to sources of input data, said clock means being connected to drive said input latches; whereby input data is provided to said first ROM through said input latches and said input multiplexer in synchronism with storage location selection in said RAM.

From a different aspect, the invention relates to a taximeter including a microprocessor as above defined and further comprising: a selector circuit subsystem having an input connected to the input of said latch means, said selector circuit subsystem being driven by said counter means; the output of said selector circuit subsystem being connected to an input of a BCD to 7 segment converter; the output of said converter being connected to a display device; whereby parameters selected on said subsystem are displayed on said display device in synchronism with storage location selection in said RAM.

BRIEF DESCRIPTION OF THE DRAWINGS

The invention will be better understood by an examination of the following description, together with the accompanying drawings, in which:

FIG. 1 is a block diagram of the electronics portion of the taximeter;

FIG. 2 is a schematic illustration of a transducer; and

FIG. 3 shows the frontface of one embodiment of a display device.

DETAILED DESCRIPTION OF THE DRAWINGS

Referring to FIG. 1, the taximeter in accordance with the invention comprises a transducer 1 for providing pulses at fixed units of distance travelled by the taxi in which the taximeter is installed. One embodiment of such a transducer is shown in FIG. 2 in which 3 is the transducer shaft which is connected in series with the speedometer cable 5 of the taxi. Four blades 7 are equally spaced around the shaft, and te blades are disposed to pass in the path of light between light emitting diode 9 and phototransistor 11. An output pulse is provided from the phototransistor each time the path of light between the LED and the phototransistor is broken by the passing of a blade 7 therebetween. As most speedometer cables are rotated at an approximate rate of 1000 turns per mile (or kilometer) travelled by the taxi, the phototransistor will provide approximately 4000 pulses per mile (or kilometer) travelled.

Returning to FIG. 1, the output of the transducer 1 is fed to one terminal of the input latches 13 which, as well known in the art comprises a plurality of bistable devices. A second input terminal of 13 is fed from an EXTRAS pushbutton on the taximeter input as will be described below. Another terminal of 13 is connected to quartz time base generator 15 which acts as the clock for the entire system. The frequency of 15 is of the order of 2.5 MHZ.

The output of 13 is fed to input multiplexer 17, and the output of the multiplexer is fed to data ROM 19.

Clock 15 also provides a timing signal to function circuits subsystem 21 which comprises an electronic counter. The count on counter 21 is increased by one each time a pulse is supplied from clock 15 until the maximum count of the counter is reached. At the next clock pulse, the counter returns to zero to begin a new cycle.

The function circuits subsystem has one output connected to the address terminals of the RAM 23, and the address on the RAM 23 which is selected at any time corresponds to the count on 21. Thus, the address of RAM 23 is sequentially stepped and accessed through its entire range in each cycle of the subsystem 21, as the maximum count on 21 corresponds to the number of addresses of RAM 23. In a preferred embodiment, RAM 23 comprises 64 storage locations, each location storing four bits so that a single binary coded digit can be stored thereat. In this embodiment, 21 has a maximum count of 64.

The output of RAM 23, referred to as last data output, consists of four lines connected to BCD adder 25, and the output of 25 is fed to latch 27. As will be seen below, new data supplied to data ROM 19 is added to the last data of RAM 23 in the adder 25. The new data is then fed to latch 27 and, in turn, to RAM 23 to thereby updata the data in RAM 23.

In the preferred embodiment, above-mentioned, the RAM 23 is a 64×4 bit memory, and the connection between 21 and 23 comprises six parallel address lines. This same output from 21 is also fed to program ROM 29, and the function of program ROM 29 is to control the operation of data ROM 19 and the remainder of the circuits as will be more fully described below. In the embodiment described herein, the program ROM acts as a "look-up" table.

Function circuits 21 also sequence selector circuit subsystem 31 which receives data input from latch 27 preparatory to feeding the data to display unit 33 where it can be visually displayed. BCD to seven segment decoder 35 converts to BCD representation to a code usable by the display unit.

Although shown as a separate unit in FIG. 1, manual select switches 37 are really a part of the display device. Parameters to be displayed on the display unit are selected by activating the appropriate rotary switch or pushbuttons on 37 to prime appropriate addresses in the selector circuit to permit passage of the data at the addresses through to the display unit.

The frontface of the display unit is illustrated in FIG. 3 and consists of a VACANT/HIRED switch 39, an EXTRAS button 41, TIME ON/TIME OFF switch 43, and readout and rate selector rotary switch 37. The display unit also includes a bank of LEDs 47 which provide a nine digit readout. The same reference numerals in FIG. 1 designate either lines from the appropriate switches in FIG. 3 or schematic representations of the same elements.

In an embodiment not illustrated herein, the VACANT/HIRED and TIME ON/TIME OFF switches are replaced with a single, 3 position switch which operates under control of the following fixed sequence:
HIRED . . . 1st, 4th, 7th . . . pushes
TIME OFF . . . 2nd, 5th, 8th . . . pushes
VACANT . . . 3rd, 6th, 9th . . . pushes.

The basic measurements which are performed by the taximeter are listed below in the order of increasing complexity:
  (a) Counting and storage of the total number of paid trips as indicated by depression of the VACANT/HIRED switch 43 at the start of each trip.
  (b) Recording and storage of the extra fare or surcharge (due to excess luggage for example) as entered by a single or repeated depression of the EXTRAS button 41. The EXTRAS display and storage are cleared before the start of each trip and new data is entered if necessary only at the start of each trip.
  (c) Recording and storage of total extras, that is, the total of all items (b) above for all trips.
  (d) Recording and storage of total miles (or kilometers) travelled, i.e., basically the same function as an odometer of a car.
  (e) Recording and storage of paid miles (or kilometers) i.e., total miles (or kilometers) travelled during the time the taxi is hired.
  (f) Processing and recording of the face, that is, the fare for each paid trip. The fare processing is a significantly more complicated function than any of the preceding items listed above. On a typical trip, the following events occur to make up the fare:
    (1) A drop fare is recorded when the VACANT/HIRED switch 39 is depressed. The drop fare could amount to, for example, 75¢.
    (2) When the taxi starts to move, it will first traverse a "dead zone" distance or time for which no extra fare is charged. The distance could typically be of the order of ⅛ of a mile.
    (3) After the dead zone distance or time has been traversed, and if the taxi is travelling faster than a cross over speed as defined below, the fare is incremented on the basis of a predetermined increment per unit of distance travelled, for example, 12¢ per 1/5 of a mile.
    (4) If the taxi decreases the speed below cross over or stops during the trip, the fare is incremented at a predetermined rate per unit of time, for example, 5¢ for each 30 second period.
    (5) If the taxi starts again after a stop has occurred, the fare continues to be incremented at the time rate until the cross over speed is again reached. The cross over speed is defined as the speed at which the rate of accumulation of distance based fare as in (3) is just equal to the rate of accumulation of time based fare as in (4), or it may be arbitrarily set to any speed in accordance with the local or municipal rate structure legally in effect.
  With the examples given above, i.e., a distance based rate of 12¢ per 1/5 of a mile and a time based rate of 5¢ for every 30 seconds, the cross over speed which yields the maximum allowable revenue is 10 miles per hour. In order to determine when the cross over speed is reached, the meter compares actual with cross over speed continuously and switches from distance based increments to time based increments below the cross over speed and from time based increments to distance based increments above the cross over speed.
(6) The time rate is switched off by the driver when he arrives at the destination of his fare by depressing the TIME ON/TIME OFF switch 43. At this point, no further fare increments can be accumulated as the timer mechanism is off and no further distance is being covered.
(7) The time rate may be switched off at any point during the trip by depressing the switch 43 if fare is to be charged solely on the basis of distance travelled.
(g) Total fares, that is, the sum of all items (f) above for all trips, is also calculated and stored and can be read out as required.

Method of Operation

The operation of one embodiment of the invention will now be described.

The data ROM and the RAM, in the described embodiment, each comprise 64 memory locations with 4 bits each, for the formation of a single BCD digit, at each location. Current information is stored in the RAM, and new data is computed by adding the contents of ROM to RAM. The data in the RAM is updated, when the address at which this data is contained in the RAM is selected by the function circuits, by applying the data of the RAM to one input of the BCD adder. The new data is then applied to the other input of the BCD adder, and the information at both inputs is then processed in the adder.

The process data is then applied to the latch 27 where it becomes available for insertion, as updated data, to an input terminal of the RAM 23. At the same time, the updated data is available to be displayed on a display device by virtue of the connection between the latch 27 and selector circuits 31.

The following examples indicate the computations and manipulations for the various functions as above described:

EXTRAS (total)

The EXTRAS data is inserted into the dedicated microprocessor by depression of a button 41 of the display. Each time the button is depressed, the appropriate address of the data ROM is activated. This address will contain a predetermined BCD number, (equivalent, for example, to 15¢) and this predetermined amount will be added to the appropriate storage location in the RAM through the BCD adder as above described. For example, if it is required to insert 45¢ of EXTRAS, then button 41 is depressed three times.

If the amount stored in the addresses of the EXTRAS in RAM 23 is, for example, $1.25, then the digits 5, 2 and 1 would be stored in 3 separate locations respectively in the RAM. These digits will be presented, in sequence, to the BCD adder when the locations at which they are stored in the RAM are selected by the function circuits.

Each depression of the EXTRAS switch 41 causes one of the input latches 13 to be "set" (to logical 1 from logical 0). Thus, when the function circuits 21 produce the address of the least significant digit (5 of the $1.25) the output of the input multiplexor 17 is a logical 1 (due to the prior setting of the EXTRAS input latch 13). The output of the input multiplexor causes the appropriate address of the data ROM to be 5 as this was the predetermined amount pre-programmed into the data ROM at this location. The 5 of the data ROM and the RAM will be added together to produce a 0 with a carry 1.

When the address of the middle significant digit of the $1.25 is selected by the function circuits, the carry 1 will be added to the 2 from the RAM and the second digit 1 from the ROM by virtue of the operation of the BCD adder. The data ROM location corresponding to the RAM location of the middle significant digit will always be a 1. The address of the data ROM corresponding to the RAM location of the most significant digit of the EXTRAS will always be a zero.

The numbers 0, 4 and 1 will be sequentially loaded into the RAM 23 after the addition has been performed so that the data at the EXTRAS locations of the RAMs will now be the updated amount of $1.40.

If there is no EXTRAS input, then only 0 will be added to the RAM data so that there will not be any change in the data in the RAM.

The total EXTRAS locations of the RAM will be updated by adding the contents of the totals locations thereto under the control of the program ROM.

The RAM contents storing the EXTRAS amounts is cleared at the start of each trip. The RAM contents for the total EXTRAS are cleared only during intentional clearing of the meter statistics.

TRIPS (total)

Total trips refers to the total number of paid trips taken by the taxi during any period. If this is cleared at the beginning of each day, then the amounts stored at the end of the day will be the total number of paid trips taken in that day. It this is cleared at the beginning of the week, then the amount stored in the RAM at the end of the week will constitute the total number of paid trips taken during the week.

Input data relative to paid trips is inserted by depression of the HIRED button 39. This data is inserted through the function circuits 21, and when the HIRED button is pressed, then the address of this information in the data ROM is activated. The data ROM at the appropriate location will contain a BCD 1 so that each time the HIRED button 39 is pressed, the relevant data at the locations in the RAM 23 will be incremented by 1.

MILES OF KILOMETERS (total)

The operation of the computing circuit for total miles (or kilometers) travelled is very similar to the operations for EXTRAS as described above. The basic difference is that the input data comprises distance pulses arriving from the transducer 1 at a rate of approximately 4000 per mile (or kilometer) travelled. Each pulse from the transducer sets a "distance" latch in the input latches, and the sequence of events for adding this new data to the data already in the RAM 23 must all take place before the next distance pulse arrives from the transducer 1.

A total of 8 digits are used for calculating and storing total miles (or kilometers) in the RAM. Thus, the maximum distance which can be stored is 99,999.999 miles (or kilometers).

As the transducer produces a distance pulse each time the taxi travels 1/4000 of a mile (or kilometer), or every 0.00025 miles (or kilometer), obviously data cannot be loaded directly into the third digit to the right of the decimal, i.e., into the thousandth position. In addition, calibration may be such that a pulse is produced for a distance which is not exactly 0.00025 miles (or kilometers), that is, it can produce a pulse every 0.000247 miles (or kilometers) or every 0.000256 miles (or kilometers). In order to allow for the use of a nominal 1/4000 mile (or kilometer) resolution, and in order to allow for a car calibration variation, or even for a change from miles to kilometers, 3 additional locations in the RAM are used, and with each transducer pulse, the numbers 2, 5 and 0, representing 0.000250 miles (or kilometers), or appropriately different numbers as discussed below, are added to respective ones of these 3 additional locations. A fourth additional location, comprising an overflow location, is filled with a 1 each time there is an overflow of the sum of the 3 additional locations, (i.e., the sum is greater than or equal to 1000) and this 1 represents 0.001 miles (or kilometers).

For a car which produces exactly 1 pulse for every 1/4000 of a mile (or kilometer), corresponding locations in ROM 19 are pre-programmed (burned) with the numbers 2, 5 and 0, representing 0.000250, or 1/4000 of a mile (or kilometer). If the transducer produces pulses at a different rate, then different numbers will be pre-programmed into the ROM. For example, if the transducer produces 1 pulse every 1/3850 miles (or kilometers), then the appropriate ROM locations will be pre-programmed to contain the numbers 2, 6 and 0, representing 0.000260, or 1/3846th of a mile (or kilometer), which is an error by only 0.1% or one part in a thousand.

A car calibration is achieved by looking up the digits, to be added to the additional locations in the RAM, in the appropriate additional locations of the ROM 19 at the appropriate moment of the RAM/ROM/adder functional sequence. These digits are then stored in the additional locations of the RAM.

To convert from miles to kilometers, appropriately different digits would be burned into the ROM locations. As a kilometer is approximately ⅝ of a mile, the transducer produces a distance pulse approximately every 1/2665 of a kilometer or every 0.00038 kilometer. Thus, the numbers 3, 8 and 0 would be burned into the appropriate ROM locations.

This is the only change necessary to convert from mileage operation to kilometer operation.

The output of the overflow additional address of the RAM will be added to the RAM address containing the thousandths data total miles (or kilometers) travelled information whenever there is a logical 1 at this overflow location. Thus, the information concerning miles (or kilometers) travelled is updated in the RAM addresses.

As will be appreciated, when the car is not moving, distance pulses will not be produced by the transducer 1. At this time, distance information of the RAM 23 cycles around the computing circuit loop unchanged along with other data (which is not necessarily unchanged) as the RAM is stepped through its memory location by the function circuits 21.

As will be appreciated, the content of the ROM will be applied only against the least significant digit (thousandths) of the RAM for total miles (or kilometers) travelled. The only time any of the other locations will be incremented is by a carry from a lesser significant digit to a more significant digit.

PAID MILES OR KILOMETERS

The operation of this circuit is the same as for total miles (or kilometers) except that in the case of paid miles (or kilometers), the accumulation is only done when the taxi has been hired and the HIRED button on the taximeter has been depressed. The accumulation of paid miles (or kilometers) begins when the HIRED button is pressed and ends, for any trip, when the VACANT button is depressed afterwards.

FARES COMPUTATION

The operation of the computing circuit for fares is more complicated than for the previous functions above described. The fare for any ride is made up of the following elements:
(1) Drop fare—a fixed fee inserted at the beginning of each paid trip when the VACANT/HIRED switch is depressed.
(2) Distance based fare—fee based on the distance travelled by the taxi when the taxi is moving in excess of a cross over speed.
(3) Time based fare—fee charged when the vehicle is moving at a speed less than the cross over speed (including not moving at all).

In addition to the complications of drop fare, time based fare and distance based fare, there is the additional element of "dead zone," which is defined as a fixed distance or a fixed time after the beginning of a trip during which the customer is not actually charged at the prevailing time or distance fare. The presence or absence of dead zone, or the actual amount thereof, is fixed by the applicable tariff regulation authorities and is therefore separately adjustable for different geographical areas in which any taximeter may be required to operate.

Five locations in the RAM are assigned to the storage of fares data. Thus, the maximum fare which can be stored in the RAM is $999.99. When the VACANT/HIRED switch 39 is depressed, and the taximeter goes into the HIRED mode, these five locations are cleared and the drop fare is added from storage locations for this data from the ROM 19. This addition takes place under the control of the program ROM during the first cycle of the function circuits after the depression of the button 39.

When there is a dead zone regulation in the area of operation, then dead zone locations will be assigned in the RAM including an overflow dead zone location. The overflow dead zone location will be filled (set to logical 1) only after the dead zone distance or time has been traversed by the vehicle. Further face accumulation will not take place until the overflow dead zone location has been filled.

The amount by which the fare is incremented is pre-programmed into memory locations in the ROM corresponding to appropriate memory locations in the RAM. Thus, if the increment is 5¢ (say for every tenth of a mile (or kilometer), then the number 5 will be pre-programmed into a memory location in the ROM corresponding to the least significant digit fares location in the RAM. Each time a tenth of a mile (or kilometer) is traversed, the memory location in the ROM will be activated to be added to the corresponding location in the RAM on the next pass of the function circuits. If the increment is 10¢, then the memory location in the ROM corresponding to the second least significant digit location in the RAM will be pre-programmed with a 1.

The calculation of the miles (or kilometers) traversed which are to be charged, or the time traversed when the vehicle is either not moving or moving at below the cross over speed, is under the control of the program ROM 29.

TOTAL FARES COMPUTATION

Five locations are provided in the RAM for the storage of total fares. These locations are not cleared at the start of each trip but have to be deliberately cleared at the discretion of the owner of the device.

The contents of the total fares addresses are continuously updated in parallel with the fares addresses. This function also comes under the control of the program ROM.

DISPLAYING PARAMETERS

As RAM 23 is continuously sequenced through all of its 64 addresses, each 4 bit 4 wire BCD digit is presented by latch 27 to display selector circuits 31. In order to select any particular parameter, manual selector select switch 37 is rotated to that selected parameter. The switch 37, in conjunction with synchronizing signals from function circuits 21, select the parameter to be displayed. Each BCD digit of that parameter is decoded by the BCD to 7 segment decoder, and the decoder is connected to light emitting diodes of 7 segments to display any decimal digit as is well known in the art.

I claim:

1. A processor for an electronic taximeter comprising:
   (A) a computer loop including:
      (1) a RAM having a plurality of updatable data storage locations therein accessible by a like plurality of addresses;
      (2) a DATA ROM having a plurality of preset data storage locations therein accessible by a like plurality of addresses;
      (3) a BCD adder receiving inputs from both said RAM and said DATA ROM to add the contents of predetermined storage locations of both;
      (4) a PROGRAM ROM whose output is fed to said DATA ROM; and
      (5) a latch receiving the output of said BCD adder and feeding an input of said RAM to thereby update said RAM with updated data from said BCD adder;
   (B) input multiplexer means fed to said DATA ROM;
   (C) means for addressing said RAM, said PROGRAM ROM, and cycling said input multiplexer means, said means comprising;
      (1) clock means; and
      (2) electronic counter means; and
   (D) function circuit means including said counter and connected to said clock means for signalling taximeter functions such as HIRED and TIME OFF;
   wherein, all calculations are performed in said computer loop.

2. A processor as defined in claim 1 and further comprising;
   input latches means;
   said input data being fed to said input latches means;
   the output of said input latches means being fed to said input multiplexer.

3. A processor as defined in claim 1 and further comprising data display means fed from said latch means.

* * * * *